US012518717B2

(12) United States Patent
Ku

(10) Patent No.: US 12,518,717 B2
(45) Date of Patent: Jan. 6, 2026

(54) TRANSPARENT DISPLAY HAVING VARIABLE LIGHT-SHIELDING PANEL, IMAGE DISPLAY DEVICE INCLUDING SAME, AND CONTROL METHOD THEREOF

(71) Applicant: LG ELECTRONICS INC., Seoul (KR)

(72) Inventor: Bonhyouk Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 18/688,813

(22) PCT Filed: Oct. 20, 2021

(86) PCT No.: PCT/KR2021/014743
§ 371 (c)(1),
(2) Date: Sep. 12, 2024

(87) PCT Pub. No.: WO2023/068400
PCT Pub. Date: Apr. 27, 2023

(65) Prior Publication Data
US 2025/0022433 A1    Jan. 16, 2025

(51) Int. Cl.
*G09G 3/38* (2006.01)
(52) U.S. Cl.
CPC ......... *G09G 3/38* (2013.01); *G09G 2320/066* (2013.01); *G09G 2320/0686* (2013.01); *G09G 2330/021* (2013.01); *G09G 2360/144* (2013.01)

(58) Field of Classification Search
CPC ..... G09G 2320/066; G09G 2320/0686; G09G 2330/021; G09G 2360/144; G09G 3/38;
(Continued)

(56) References Cited

U.S. PATENT DOCUMENTS

| 8,102,586 B2 * | 1/2012 | Albahri | ............. B32B 17/10513 |
| | | | 359/265 |
| 2009/0027759 A1 * | 1/2009 | Albahri | ...................... B60J 3/04 |
| | | | 359/601 |

(Continued)

FOREIGN PATENT DOCUMENTS

| KR | 10-2008-0056932 A | 6/2008 |
| KR | 10-2014-0063060 A | 5/2014 |

(Continued)

*Primary Examiner* — Richard J Hong
(74) *Attorney, Agent, or Firm* — Birch, Stewart, Kolasch & Birch, LLP

(57) ABSTRACT

The present disclosure relates to a transparent display having a variable light-shielding panel which may increase visibility by increasing ACR even in a bright room environment, and an image display device including same. The present disclosure may provide an image display device comprising: a transparent display including a transparent display panel and a variable light-shielding panel which overlaps one lateral surface of the transparent display panel; and a controller for performing control so that a portion of the variable light-shielding panel, which corresponds to a position of a video content being displayed in the transparent display panel, is in a light-shielding mode and the remaining portion is in a transparent mode.

11 Claims, 12 Drawing Sheets

(58) Field of Classification Search
CPC .......... G09G 3/19; G09G 3/20; H10K 59/50; H10K 59/8792; G06F 3/147; G06F 3/01; G06F 3/04886; G06F 3/041; C09D 179/08; G02F 1/172; G02F 1/13781; B32B 17/10513; G06V 20/00; H04M 1/0266; G02B 27/0101; G02B 27/0172; H04N 23/611; B60J 1/02; B60J 3/04

See application file for complete search history.

(56) References Cited

U.S. PATENT DOCUMENTS

| | | | | |
|---|---|---|---|---|
| 2011/0164047 A1* | 7/2011 | Pance | ........................ | G06F 3/01 361/679.01 |
| 2014/0063049 A1* | 3/2014 | Armstrong-Muntner | ................... | H04N 23/611 345/619 |
| 2014/0139559 A1* | 5/2014 | Yoo | ......................... | G06F 3/147 345/690 |
| 2015/0062175 A1* | 3/2015 | Kim | .................... | G06F 3/04886 345/639 |
| 2017/0060512 A1* | 3/2017 | Rakshit | .................... | G06F 3/041 |
| 2018/0033171 A1* | 2/2018 | Rakshit | .................. | G06V 20/00 |
| 2018/0186932 A1* | 7/2018 | Liou | ..................... | C09D 179/08 |
| 2018/0241858 A1* | 8/2018 | Fan | ...................... | H04M 1/0266 |
| 2019/0324273 A1* | 10/2019 | Perdices-Gonzalez | ...................... | G02B 27/0172 |
| 2020/0290440 A1* | 9/2020 | Ma | .............................. | B60J 1/02 |
| 2021/0096417 A1* | 4/2021 | Firka | ................... | G02F 1/13781 |
| 2021/0118411 A1* | 4/2021 | Ahn | .................... | G02B 27/0101 |
| 2022/0342270 A1* | 10/2022 | Park | ........................ | G02F 1/172 |

FOREIGN PATENT DOCUMENTS

| | | |
|---|---|---|
| KR | 10-2014-0115043 A | 9/2014 |
| KR | 10-2015-0002032 A | 1/2015 |
| KR | 10-2015-0026565 A | 3/2015 |
| KR | 10-2018-0020126 A | 2/2018 |
| KR | 10-2178675 B1 | 11/2020 |
| WO | 2013/048443 A1 | 4/2013 |

* cited by examiner

FIG. 6

| A1 | A2 | A3 | A4 | A5 | A6 |
|----|----|----|----|----|----|
| A7 | A8 | A9 | A10 | A11 | A12 |
| A13 | A14 | A15 | A16 | A17 | A18 |
| A19 | A20 | A21 | A22 | A23 | A24 |
| A25 | A26 | A27 | A28 | A29 | A30 |
| A31 | A32 | A33 | A34 | A35 | A36 |

~182

| B1 | B2 | B3 | B4 | B5 | B6 |
|----|----|----|----|----|----|
| B7 | B8 | B9 | B10 | B11 | B12 |
| B13 | B14 | B15 | B16 | B17 | B18 |
| B19 | B20 | B21 | B22 | B23 | B24 |
| B25 | B26 | B27 | B28 | B29 | B30 |
| B31 | B32 | B33 | B34 | B35 | B36 |

| A1 | A2 | A3 | A4 | A5 | A6 |
|----|----|----|----|----|----|
| A7 | A8 | A9 | A10 | A11 | A12 |
| A13 | A14 | A15 | A16 | A17 | A18 |
| A19 | A20 | A21 | A22 | A23 | A24 |
| A25 | A26 | A27 | A28 | A29 | A30 |
| A31 | A32 | A33 | A34 | A35 | A36 |

~182

| B1 | B2 | B3 | B4 | B5 | B6 |
|----|----|----|----|----|----|
| B7 | B8 | B9 | B10 | B11 | B12 |
| B13 | B14 | B15 | B16 | B17 | B18 |
| B19 | B20 | B21 | B22 | B23 | B24 |
| B25 | B26 | B27 | B28 | B29 | B30 |
| B31 | B32 | B33 | B34 | B35 | B36 |

~181

TRANSPARENT DISPLAY HAVING VARIABLE LIGHT-SHIELDING PANEL, IMAGE DISPLAY DEVICE INCLUDING SAME, AND CONTROL METHOD THEREOF

CROSS REFERENCE TO RELATED APPLICATIONS

This application is the National Phase of PCT International Application No. PCT/KR2021/014743, filed on Oct. 20, 2021, which is hereby expressly incorporated by reference into the present application.

TECHNICAL FIELD

The present disclosure relates to a transparent display with a variable shading panel, an image display device including the same, and a method for controlling thereof.

BACKGROUND

An image display device includes, for example, a function for receiving and processing a broadcast image viewable by a user. The image display device displays a broadcast, which is selected by the user from among broadcast signals transmitted from a broadcast station, on a display. Currently broadcasters are transitioning from analog to digital broadcasting.

Digital broadcasting refers to broadcasting of digital video and audio signals. The digital broadcast has low data loss due to robustness against external noise, error correction, high resolution, and a high-definition screen, as compared with an analog broadcast. In addition, digital broadcasting can provide a bidirectional service unlike analog broadcasting.

In order to use digital broadcasting including a variety of content, the performance of an image display device has been improved and the function thereof has been diversified. As the performance of the image display device has been improved, various functions of the image display device, such as gaming, music listening or Internet shopping, using various applications can be performed in addition to a function for receiving an image signal from a broadcast station and viewing a broadcast.

For such image display devices, flat panel display devices including liquid crystal displays (LCDs), organic light-emitting diode (OLED) displays, and plasma display panels (PDPs) are mainly used.

The OLED display is a self-luminous device that illuminates organic emitting layers based on the recombination of electrons and holes. Accordingly, the OLED display is expected to be a next-generation display device due to high brightness, low driving voltage, and capability for thin-film formation.

In addition, for the OLED display, the cathode and anode may be implemented as transparent electrodes, and each pixel may be configured with an OLED, a pixel circuit for driving the OLED, and a transparent portion. Thus, the OLED display may be implemented as a transparent display capable of displaying information on both sides of the display by emitting light on both sides.

However, transparent OLED displays face challenges in implementing black to block transmitted light through the transparent portion of each pixel and suffer from reduced visibility due to decreases in the ambient contrast ratio (ACR) caused by external light in bright room environments.

DISCLOSURE

Technical Problem

The present disclosure aims to provide a transparent display with a variable shading panel capable of enhancing visibility by increasing the ambient contrast ratio (ACR) even in bright room environments, an image display device including the same, and a method for controlling thereof.

Technical Solution

In an aspect of the present disclosure, provided herein is an image display device. The image display device may include: a transparent display including a transparent display panel and a variable shading panel overlaid on one side of the transparent display panel; and a controller configured to: control a portion of the variable shading panel related to a location of video content displayed on the transparent display panel to be in a shading mode; and control remaining portions of the variable shading panel to be in a transparent mode.

The variable shading panel may be divided into a plurality of shading regions, and the controller may be configured to: control several shading regions related to the location of the video content among the plurality of shading regions to be in the shading mode; and control remaining shading regions to be in the transparent mode.

The variable shading panel may include an electrochromic device, and the controller may be configured to: supply power to the several shading regions to be in the shading mode; and supply no power to the remaining shading regions to be in the transparent mode.

The portion of the variable shading panel in the shading mode may be determined to be equivalent to a minimum area capable of accommodating a size of the video content.

Alternatively, the portion of the variable shading panel in the shading mode may be determined by at least one of a plurality of image parameters of the video content.

In this case, the portion of the variable shading panel in the shading mode may be related to a region where the at least one of the plurality of image parameters of the video content is either greater than or equal to a predetermined value or smaller than the predetermined value.

The variable shading panel may be overlaid on a back of the transparent display panel, and the video content may be displayed in a background of the portion of the variable shading panel in the shading mode.

External light incident from the back of the transparent display may be blocked by the portion of the variable shading panel in the shading mode.

The image display device may further comprise an ambient light sensor, and the controller may be configured to adjust shading intensity of the portion of the variable shading panel in the shading mode based on to brightness of ambient light detected by the ambient light sensor.

The controller may be configured to control the shading intensity to be proportional to the measured ambient light brightness.

In another aspect of the present disclosure, provided herein is a transparent display. The transparent display may include: a transparent display panel; a variable shading panel overlaid on one side of the transparent display panel; and a shading panel controller configured to individually supply power to a plurality of shading regions of the variable shading panel. Power may be supplied to a portion of the plurality of shading regions such that the portion of the plurality of shading regions is in a shading mode, and no power may be supplied to remaining portions such that the remaining portions are in a transparent mode.

In a further aspect of the present disclosure, provided herein is a method of controlling an image display device. The method may include: determining a display location of video content displayed on a transparent display panel; and controlling a portion of a variable shading panel overlaid on one side of the transparent display panel to be in a shading mode and remaining portions of the variable shading panel to be in a transparent mode, wherein the portion of the variable shading panel is related to the display location.

Advantageous Effects

According to the present disclosure, a transparent display with a variable shading panel and an image display device including the same have the following effects.

According to at least one of the embodiments of the present disclosure, some regions of a variable shading panel may be selectively set to a shading mode, thereby improving visibility by increasing the ambient contrast ratio (ACR) even in bright room environments.

According to at least one of the embodiments of the present disclosure, when some regions of the variable shading panel are selectively set to the shading mode, the shading intensity may be adjusted differently depending on ambient light brightness, thereby maximizing the characteristics of a transparent display.

BRIEF DESCRIPTION OF THE DRAWINGS

FIGS. 6 and 7 illustrate relationships between a variable shading panel including a plurality of shading regions and a transparent display panel including a plurality of display regions according to an embodiment of the present disclosure.

DETAILED DESCRIPTION

Description will now be given in detail according to exemplary aspects disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well known to one of ordinary skill in the relevant art has generally been omitted for the sake of brevity. The accompanying drawings are used to help easily understand various technical features and it should be understood that the aspects presented herein are not limited by the accompanying drawings. As such, the present disclosure should be construed to extend to any alterations, equivalents, and substitutes in addition to those which are particularly set out in the accompanying drawings.

The terms "module" and "unit" attached to describe the names of components are used herein to help the understanding of the components and thus should not be considered as having specific meanings or roles. Accordingly, the terms "module" and "unit" may be used interchangeably.

Aspects of this disclosure will be described in detail with reference to the attached drawings, but it should be understood that they are merely illustrative of this disclosure and should not be interpreted as limiting the scope of this disclosure.

In addition, although the terms used in this disclosure are selected from generally known and used terms, some of the terms mentioned in the description of this disclosure, the detailed meanings of which are described in relevant parts of the description herein, have been selected at the discretion of the applicant. Furthermore, this disclosure must be understood, not simply by the actual terms used but by the meanings of each term lying within.

Figure 1:
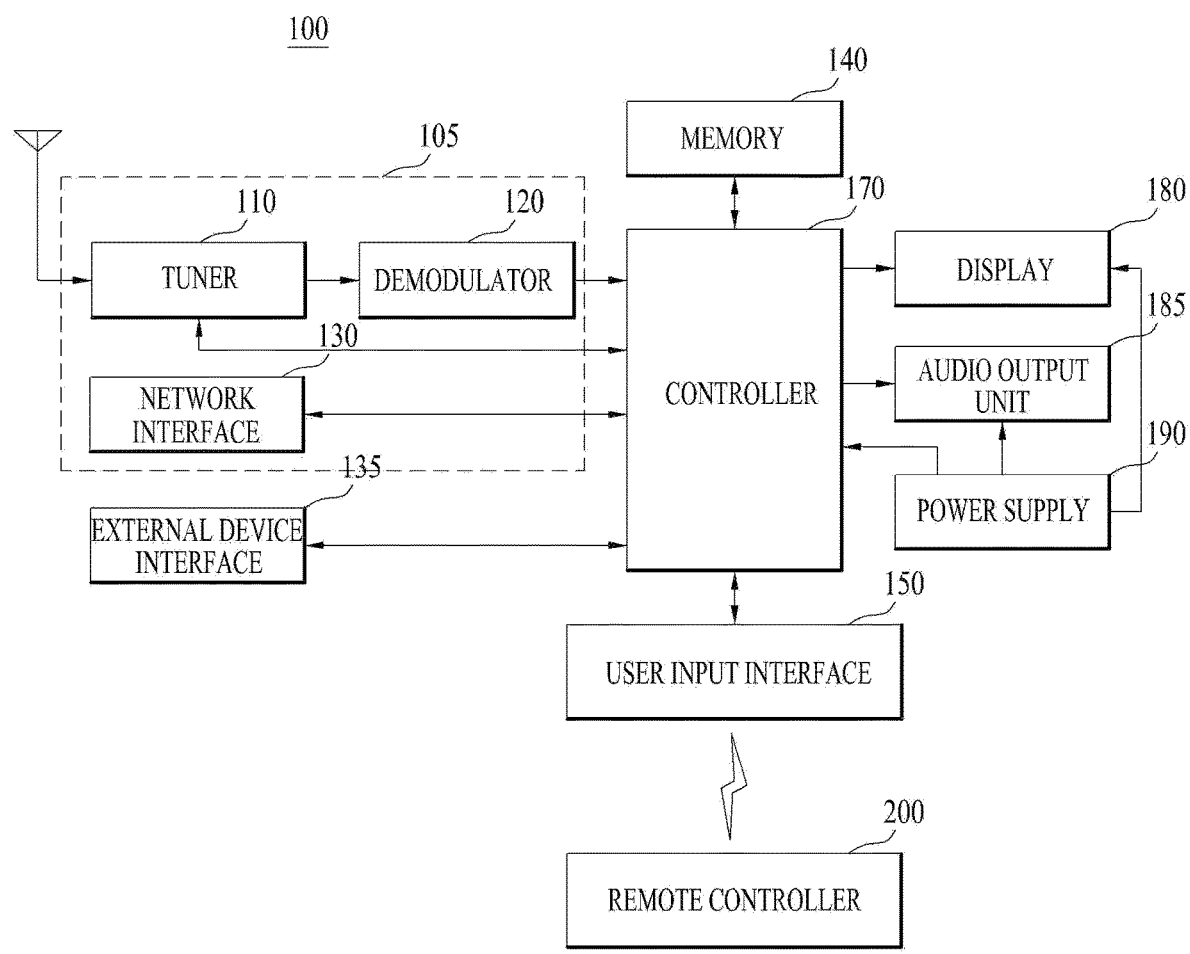
FIG. 1 is a schematic block diagram of an image display device according to one aspect of the present disclosure.

FIG. 1 is a schematic block diagram of an image display device according to one aspect of the present disclosure.

Referring to FIG. 1, an image display device 100 according to one aspect of this disclosure includes a broadcast receiver 105, an external device interface 135, a memory 140, a user input interface 150, a controller 170, a display 180, an audio output unit 185, a power supply 190, and a camera module (not shown).

The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal Side-Band (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving, and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The TS output from the demodulator 120 may be input to the controller 170 and thus subjected to demultiplexing and A/V signal processing. The processed video and audio signals are output to the display 180 and the audio output unit 185, respectively.

The external device interface 135 may serve as an interface between an external device and the image display device 100. For interfacing, the external device interface 135 may include an A/V Input/Output (I/O) unit (not shown) and/or a wireless communication module (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video, and data signals from or to the external device, the external device interface 135 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 135 may be connected to various set-top boxes through at least one of the above-described ports and may thus perform an I/O operation with the various set-top boxes.

The external device interface 135 may receive applications or an application list from an adjacent external device and provide the applications or the application list to the controller 170 or the memory 140.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network.

In an aspect of this disclosure, when a game application is executed in the image display device, the network interface 130 may transmit data to or receive data from a user terminal connected to the image display device through a network. In addition, the network interface 130 may transmit specific data to or receive specific data from a server that records game scores.

The memory 140 may store various programs necessary for the controller 170 to process and control signals, and may also store processed video, audio, and data signals.

The memory 140 may temporarily store a video, audio and/or data signal received from the external device interface 135 or the network interface 130. The memory 140 may store information about broadcast channels by the channel storage function.

The memory 140 may store applications or a list of applications received from the external device interface 135 or the network interface 130.

In an aspect of this disclosure, when the image display device provides a game application, the memory 140 may store user-specific information and game play information of a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or extreme Digital (XD) memory), a Random Access Memory (RAM), or a Read-Only Memory (ROM) such as an Electrically Erasable and Programmable Read Only Memory (EEPROM). The image display device 100 may reproduce content stored in the memory 140 (e.g., video files, still image files, music files, text files, and application files) to the user.

While the memory 140 is shown in FIG. 1 as configured separately from the controller 170, to which this disclosure is not limited, the memory 140 may be incorporated into the controller 170, for example.

The user input interface 150 transmits a signal received from the user to the controller 170 or transmits a signal received from the controller 170 to the user.

For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication.

For example, the user input interface 150 may provide the controller 170 with control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135.

While not shown in FIG. 1, the controller 170 may include a DEMUX and a video processor.

In addition, the controller 170 may provide overall control to the image display device 100. For example, the controller 170 may control the tuner 110 to tune to an RF broadcast signal corresponding to a user-selected channel or a pre-stored channel.

The controller 170 may control the image display device 100 according to a user command received through the user input interface 150 or according to an internal program. Especially the controller 170 may access a network and download an application or application list selected by the user to the image display device 100 over the network.

For example, the controller 170 controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content play back. The content may include any content stored in the image display device 100, received broadcast content, and externally input content. The content includes at least one of a broadcast image, an externally input image, an audio file, a still image, a Web page, or a text file.

Upon receipt of a return-to-home screen input, the controller 170 may control display of the home screen on the display 180.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device. The card objects may further include at least one of a card object representing a list of connected external devices or a card object representing a call-associated list.

The home screen may further include an application menu including at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The size of the broadcast image may be set to a fixed size.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may control the display 180 to display the selected card object on the full screen.

Upon receipt of an incoming call at a connected external device or the image display device 100, the controller 170 may control focusing-on or shift of a call-related card object among the plurality of card objects.

If an application view menu item is selected, the controller 170 may control display of applications or a list of applications that are present in the image display device 100 or downloadable from an external network.

The controller 170 may control installation and execution of an application downloaded from the external network along with various UIs. Also, the controller 170 may control display of an image related to the executed application on the display 180, upon user selection.

Although not shown, the image display device 100 may further include a channel browsing processor for generating thumbnail images corresponding to channel signals or externally input signals.

The channel browsing processor may receive the TS output from the demodulator 120 or the TS output from the external device interface 135, extract images of the received TS and generate thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touchscreen that can be used not only as an output device but also as an input device.

The audio output unit 185 may receive a processed audio signal (e.g., a stereo signal, a 3.1-channel signal, or a 5.1-channel signal) from the controller 170 and output the received audio signal as sound. The audio output unit 185 may employ various speaker configurations.

To sense a user gesture, the image display device 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display device 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display device 100.

Particularly, the power supply 190 may supply power to the controller 170 which may be implemented as a System On Chip (SOC), the display 180 for displaying an image, and the audio output unit 185 for audio output.

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, Ultra Wideband (UWB) and ZigBee.

In addition, the remote controller 200 may receive a video signal, an audio signal, or a data signal from the user input interface 150 and output the received signals visually, audibly or as vibrations.

The above-described image display device 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 100 illustrated in FIG. 1 is purely exemplary. Depending upon the specifications of the image display device 100 in actual implementation, the components of the image display device 100 may be combined or omitted or new components may be added. That is, two or more components may be incorporated into one component or one component may be configured as separate components, as needed. In addition, the function of each block is described for the purpose of describing the aspect of this disclosure and thus specific operations or devices should not be construed as limiting the scope and spirit of this disclosure.

Unlike the configuration illustrated in FIG. 1, the image display device 100 may be configured so as to receive and play back video content through the network interface 130 or the external device interface 135, without the tuner 110 and the demodulator 120 shown in FIG. 1.

Figure 2:
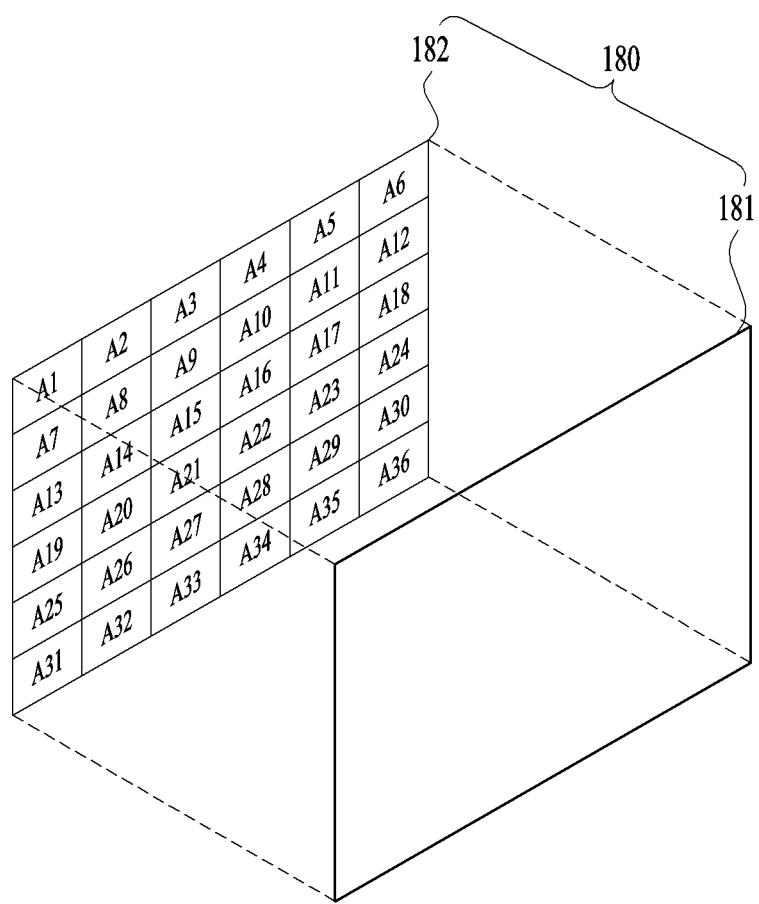
FIG. 2 illustrates a transparent display configured according to an embodiment of the present disclosure.

Hereinafter, the display 180 will be described in detail with reference to FIG. 2. FIG. 2 illustrates a transparent display configured according to an embodiment of the present disclosure.

The display 180 may be a transparent display including a transparent display panel 181 and a variable shading panel 182.

A representative example of the transparent display panel 181 includes (but is not limited to) a transparent OLED display panel.

As described above, transparent OLED display's face challenges in implementing black to block transmitted light through the transparent portion of each pixel and suffer from reduced visibility due to decreases in the ambient contrast ratio (ACR) caused by external light in bright room environments.

To address these issues, the variable shading panel 182, which controls shading based on the application of voltage, may be overlaid on and attached to one side of the transparent OLED display panel 181 as illustrated in FIG. 2. Examples of such variable shading panels include polymer-dispersed liquid crystals (PDLCs) and electrochromic devices known as electrochromic filters (the present disclosure is not limited thereto). FIG. 2 illustrates an example where the variable shading panel 182 is overlaid on and attached to the back of the transparent OLED display panel 181.

PDLCs become transparent when power is supplied and become opaque when no power is supplied. In other words, PDLCs maintain an opaque state by default when no power is supplied.

In contrast, electrochromic devices become opaque when power is supplied and become transparent when no power is supplied. Therefore, electrochromic devices maintain a transparent state by default when no power is supplied.

As the name suggests, the transparent display panel 181 often needs to maintain the transparent state. To comply with the transparent state of the transparent display panel 181, the variable shading panel 182 also needs to maintain the transparent state. Thus, for use as the variable shading panel 182, electrochromic devices, which maintain the transparent state by default when no power is supplied, may be more advantageous in terms of power consumption compared to PDLCs. Hereinafter, it is assumed that the variable shading panel 182 is configured with the electrochromic device.

The variable shading panel 182, as shown in FIG. 2, may be divided into multiple shading regions (or blocks). FIG. 2 illustrates that the variable shading panel 182 is divided into 36 regions (A1 to A36). However, the present disclosure is not limited thereto. The variable shading panel 182 may be divided into a greater or lesser number of regions. FIG. 2 shows that multiple shading regions are arranged adjacent to each other, but the shading regions may also be arranged with a predetermined spacing.

Since the response time of the electrochromic device increases proportionally with the area thereof, the overall response time may be improved if the electrochromic device is divided into smaller blocks.

Figure 3:
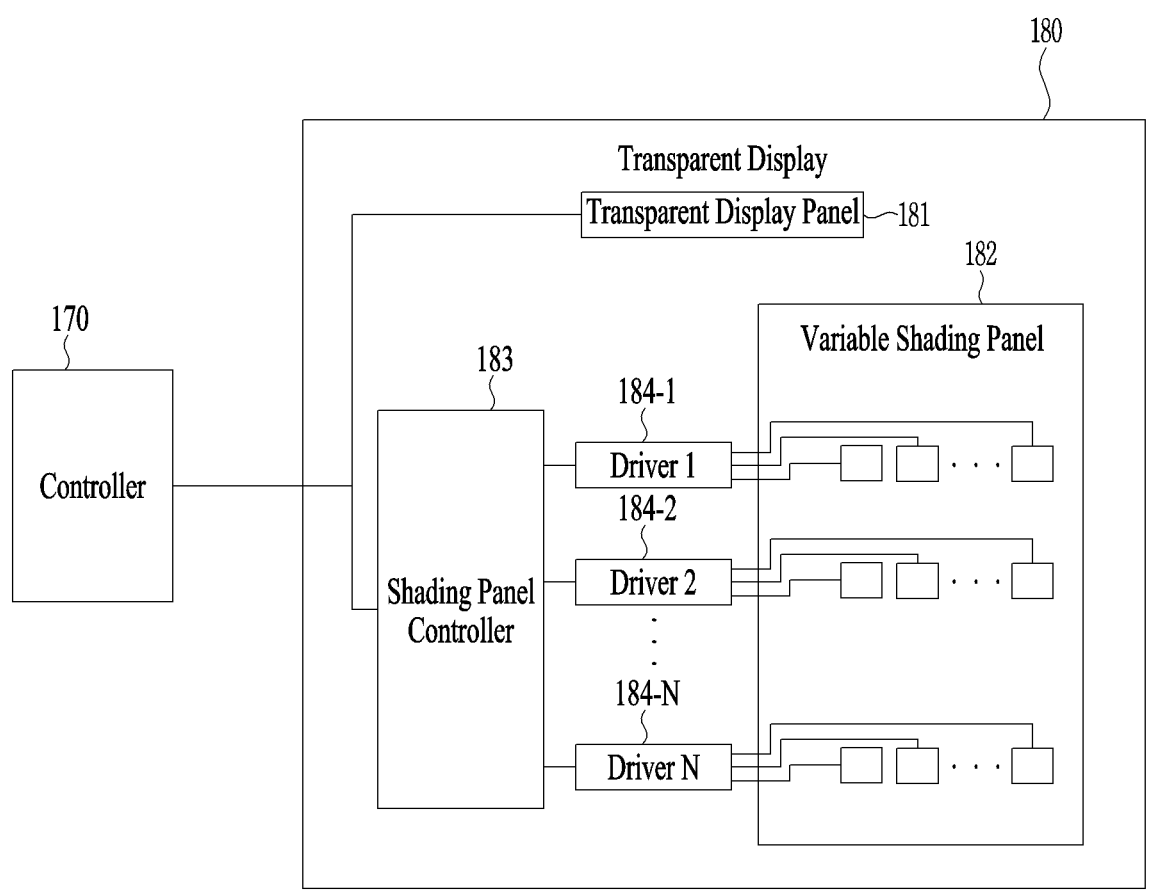
FIG. 3 illustrates an internal block diagram of a transparent display configured according to an embodiment of the present disclosure.

Each shading region of the variable shading panel 182 may switch between a transparent mode and a shading mode. This will be described in detail with reference to FIG. 3. FIG. 3 illustrates an internal block diagram of a display configured according to an embodiment of the present disclosure.

The transparent display 180, which is controlled by the controller 170, may include not only the transparent display panel 181 and the variable shading panel 182 but also a shading panel controller 183 and a plurality of drivers 184-1 to 184-N.

The shading panel controller 183 may communicate with the controller 170 to receive information on shading regions to be powered on or off and transmit control signals to each driver.

The plurality of drivers 184-1 to 184-N may supply power to the shading regions that need to be powered on based on the control signals received from the shading panel controller 183. In contrast, the plurality of drivers 184-1 to 184-N may withhold power from the shading regions that need to be powered off. The shading regions receiving power may enter the shading mode, while the shading regions without power may enter the transparent mode.

FIG. 3 illustrates that one driver is responsible for multiple shading regions. The driver may simultaneously power on or off the multiple shading regions or individually power on or off the multiple shading regions.

The transparent display 180 may be equipped with a display panel controller (not shown) to control the transparent display panel 181. However, the display panel controller is omitted in FIG. 3 for the sake of clarity.

Figure 4:
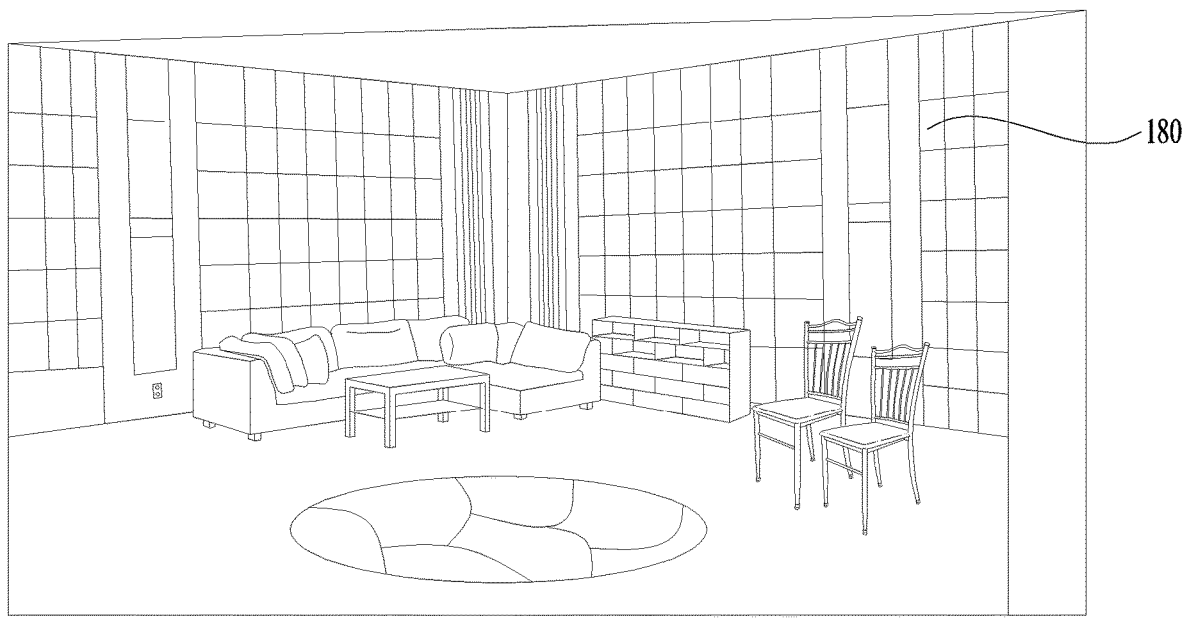
FIGS. 4 and 5 illustrate the operations of a transparent display when no power is supplied to a variable shading panel configured according to an embodiment of the present disclosure.
Figure 5:
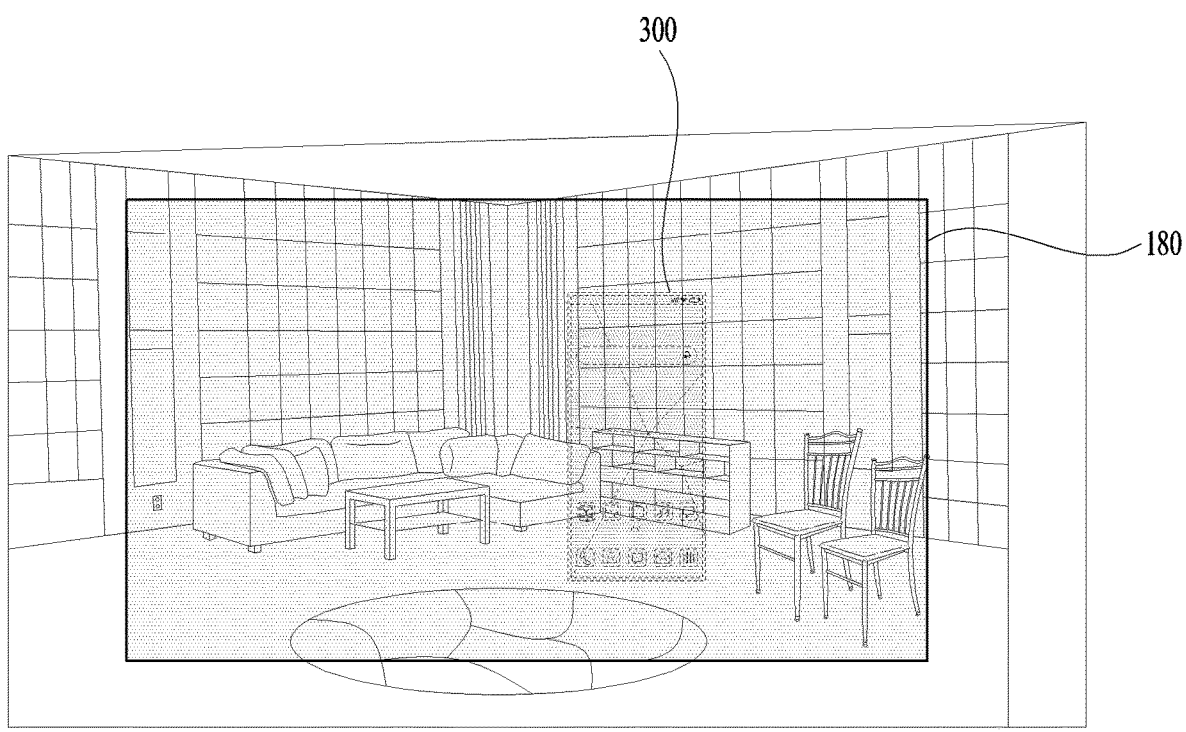

Hereinafter, the operation of the transparent display 180 will be described in detail. With reference to FIGS. 4 and 5, the operation of the transparent display 180 when no power is supplied to the variable shading panel 182 (i.e., when all shading regions of the variable shading panel 182 are in the transparent mode) will be described. FIGS. 4 and 5 illustrate the operations of a transparent display when no power is supplied to a variable shading panel configured according to an embodiment of the present disclosure. A case where no power is supplied to the variable shading panel may be understood as equivalent to a case where the variable shading panel 182 is not provided in the transparent display 180.

FIG. 4 illustrates a scenario where nothing is displayed on the transparent display 180 of the image display device 100 placed in a bright living environment. For the sake of simplicity, only the transparent display 180 is illustrated in FIG. 4. Since no power is supplied to the variable shading panel 182 of the transparent display 180, all shading regions of the variable shading panel 182 are in the transparent mode. Thus, external light incident from the rear may pass through the transparent display 180 and be visible to a user in front.

FIG. 5 illustrates that video content 300 is displayed on certain areas of the transparent display 180 shown in FIG. 4. FIG. 5 shows that the video content 300 is mirrored from the screen of a smartphone (not shown) to the image display device 100. However, the present disclosure is not limited thereto.

As shown in FIG. 5, the transparent display 180 allows external light incident from the rear to pass through the transparent portion of each pixel. Therefore, in a bright room environment, the visibility of the displayed video content may be reduced due to decreases in the ACR caused by the external light.

Hereinafter, solutions to address this issue will be described.

FIGS. 6 and 7 illustrate relationships between a variable shading panel including a plurality of shading regions and a transparent display panel including a plurality of display regions according to an embodiment of the present disclosure.

As described above, the variable shading panel 182 may be divided into a plurality of shading regions. FIG. 6 illustrates that the variable shading panel 182 has 36 shading regions named A1 to A36, respectively.

Each of the plurality of shading regions may correspond to a plurality of display regions of the transparent display panel 181. FIG. 6 shows that 36 display regions related to the plurality of shading regions are named B1 to B36, respectively. Specifically, shading regions A1, A2, . . . , A36 may correspond to display regions B1, B2, . . . , B36, respectively.

The horizontal and vertical lines for representing the plurality of display regions of the transparent display panel 181 in FIG. 6 may be virtual lines, and the lines on the transparent display panel 181 may not actually be visible to the naked eyes.

As shown in FIG. 7, the controller 170 of the image display device 100 may control video content to be displayed on at least one display region of the transparent display panel 181. In FIG. 7, the at least one display region is exemplified as regions B10, B11, B16, B17, B22, B23, B28, and B29.

In this case, the controller 170 may control the shading panel controller 183 to supply power to at least one shading region related to the at least one display region of the transparent display panel 181. In FIG. 7, the at least one shading region related to the at least one display region is exemplified as regions A10, A11, A16, A17, A22, A23, A28, and A29. That is, the at least one shading region may be determined to have a minimum area that accommodates the size of the video content. The minimum area may be equal to or greater than the size of the video content.

If the at least one display region where the video content is displayed changes, the at least one shading region may also change such that the at least one shading region is related to the changed display region.

The at least one shading region receiving power may enter the shading mode, while the remaining shading regions without power may enter the transparent mode.

Figure 8:
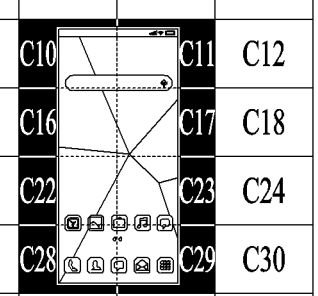
FIG. 8 illustrates an overlay between the transparent display panel and variable shading panel shown in FIG. 7.

FIG. 8 illustrates that the variable shading panel 182 having at least one shading region operating in the shading mode is overlaid on the back of the transparent display panel 181 having at least one display region for displaying video content. In other words, FIG. 8 shows that the transparent display panel is overlaid with the variable shading panel in FIG. 7.

In FIG. 8, 36 overlapping regions where 36 shading regions of the variable shading panel 182 overlap with 36 display regions of the transparent display panel 181 are named C1 to C36. Specifically, shading regions A1, A2, . . . , A36 are related to and overlap with display regions B1, B2, . . . , B36, forming overlapping regions C1, C2, . . . , C36.

As shown in FIG. 8, video content may be displayed in at least one overlapping region related to the at least one display region of the transparent display panel 181 in the background of the variable shading panel 182 in the shading mode. In FIG. 8, the at least one overlapping region is exemplified as regions C10, C11, C16, C17, C22, C23, C28, and C29.

Figure 9:
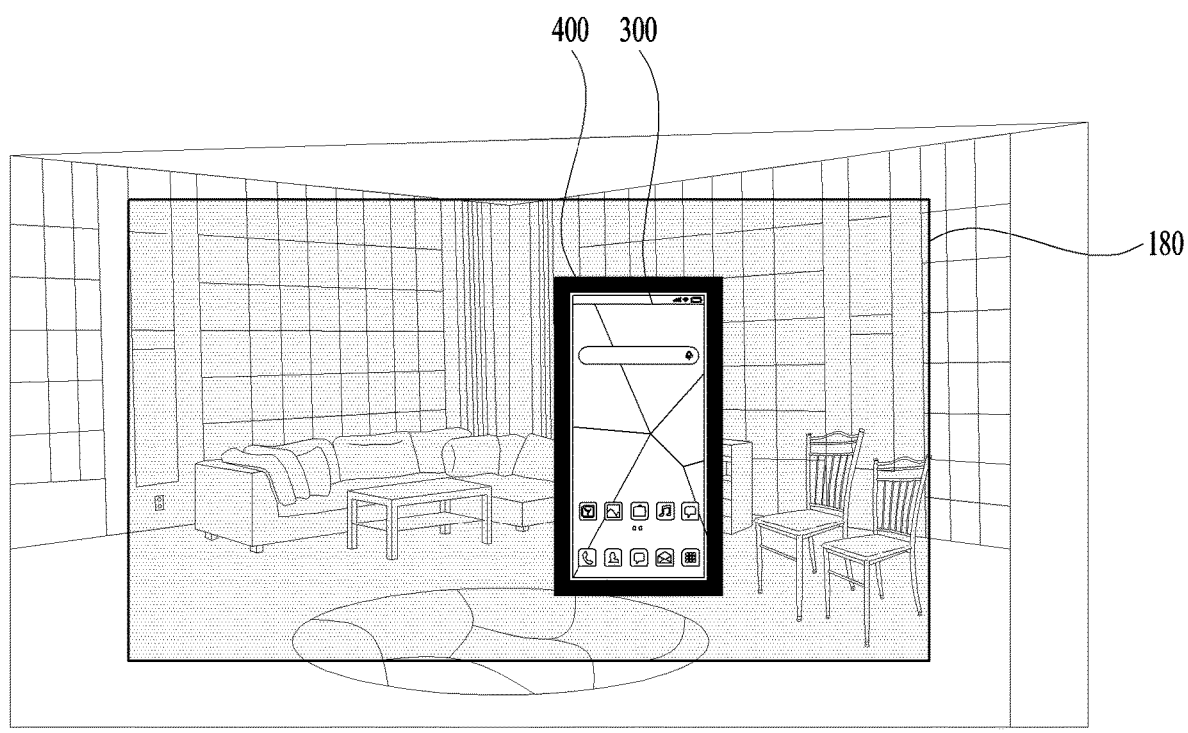
FIGS. 9 and 10 illustrate the operations of a transparent display when power is supplied to a variable shading panel configured according to an embodiment of the present disclosure.

Hereinafter, a case in which the transparent display 180 that displays video content on the transparent display panel 181 in the background of the variable shading panel 182 in the shading mode is placed in a bright living environment will be described with reference to FIG. 9. FIG. 9 illustrates the operations of a transparent display when power is supplied to a variable shading panel configured according to an embodiment of the present disclosure.

FIG. 9 shows a scenario in which video content is displayed on the transparent display 180 of the image display device 100 placed in a bright living environment. For simplicity, only the transparent display 180 is illustrated in FIG. 9.

The transparent display 180 may display video content 300 in the background of at least one overlapping region 400 in the shading mode.

Therefore, even though the transparent display 180 allows external light incident from the rear to pass through the transparent portion of each pixel, the external light is blocked in the at least one overlapping region 400 where the video content 300 is displayed, that is, the external light is incapable of passing through the at least one overlapping region 400 because the variable shading panel 182 is in the shading mode. Accordingly, in a bright room environment, the ACR does not significantly decrease due to the external light, and the visibility of the displayed video content may not be degraded. Furthermore, the attention may be more focused on the video content 300 displayed in the at least one overlapping region 400.

Figure 10:
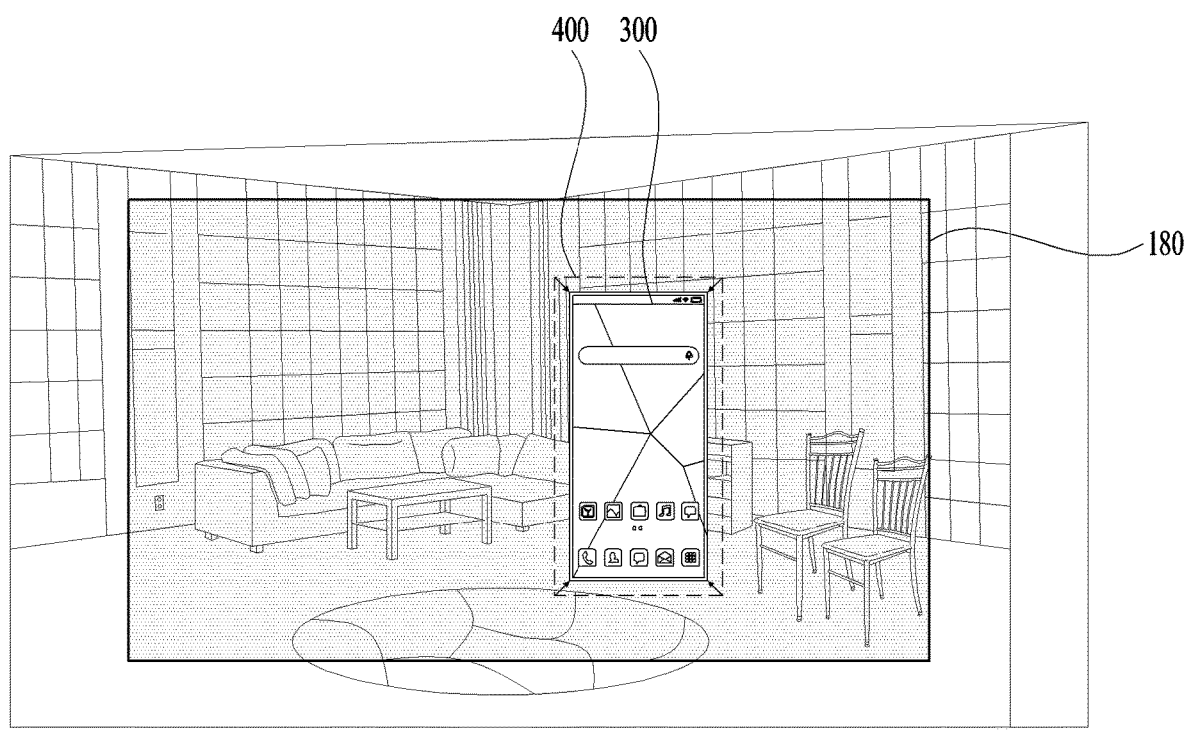

In FIG. 9, the area of the at least one overlapping region 400 in the shading mode is exemplified to be larger than the size of the video content 300. However, the present disclosure is not limited thereto. For example, the area of the at least one overlapping region 400 in the shading mode may be approximately the same as the size of the video content 300. This will be described in detail with reference to FIG. 10. FIG. 10 illustrates the operations of a transparent display when power is supplied to a variable shading panel configured according to an embodiment of the present disclosure.

In FIG. 9, 36 shading regions are exemplified. As the number of shading regions increases, the resolution of the variable shading panel increases, and the minimum area of the overlapping region in the shading mode capable of accommodating the size of the video content may approximate the size of the video content.

FIG. 10 illustrates that as the resolution of a variable shading panel increases sufficiently, the area of an overlapping region in the shading mode intends to approximate the size of video content.

Figure 11:
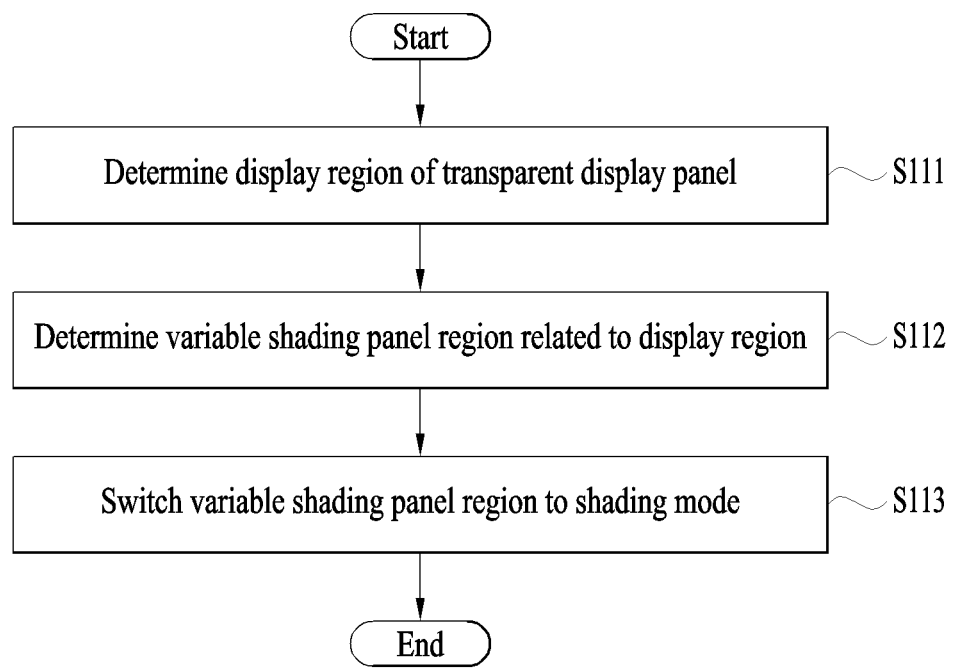
FIG. 11 is a flowchart illustrating a process for determining a region switching to a shading mode within a variable shading panel of a transparent display according to an embodiment of the present disclosure.

Hereinafter, a process for determining a region switching to the shading mode in a variable shading panel of a transparent display according to an embodiment of the present disclosure will be described with reference to FIG. 11. Specifically, FIG. 11 is a flowchart illustrating a process for determining a region switching to the shading mode within a variable shading panel of a transparent display according to an embodiment of the present disclosure.

First, the controller 170 of the image display device 100 may determine a region of the transparent display panel 181 where video content is displayed [S111].

Next, the controller 170 may determine a region of the variable shading panel 182 related to the region where the video content is displayed [S112].

Then, the controller 170 may switch the determined region of the variable shading panel 182 to the shading mode [S113].

In the above, it has been described that the entire region of the variable shading panel 182 related to the region where the video content is displayed switches to the shading mode. However, the present disclosure is not limited thereto. For example, only a region of the variable shading panel 182 related to some parts of the region where the video content is displayed may switch to the shading mode. The parts of the region where the video content is displayed may be: i) a region preconfigured when the video content is prepared, or ii) a region where at least one of various image parameters (e.g., contrast, brightness, sharpness, etc.) is above or below a prescribed value.

The shading intensity of the region switching to the shading mode within the variable shading panel may be predefined as a specific shading intensity. For example, the shading intensity may be the maximum intensity achievable by the variable shading panel. However, when the shading intensity reaches the maximum intensity, it may diminish the advantage of the transparent display. On the other hand, if the shading intensity decreases, it is difficult to improve visibility in bright room environments.

Figure 12:
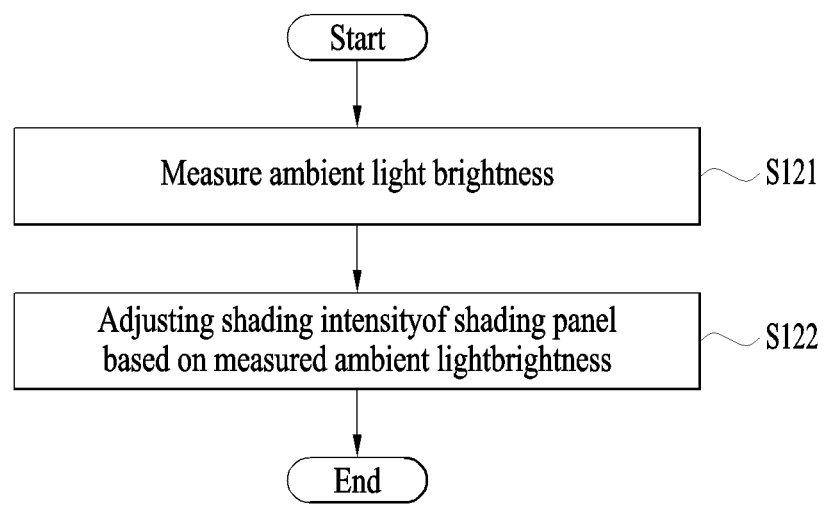
FIG. 12 is a flowchart illustrating a process for determining the shading intensity of a variable shading panel of a transparent display according to an embodiment of the present disclosure.

It may be desirable that the shading intensity vary depending on the environment in which the image display device 100 is placed. This will be described in detail with reference to FIG. 12. FIG. 12 is a flowchart illustrating a process for determining the shading intensity of a variable shading panel of a transparent display according to an embodiment of the present disclosure.

If the image display device 100 or the transparent display 180 is equipped with an ambient light sensor, the controller 170 may measure the ambient brightness of a location where the image display device 100 is placed through the ambient light sensor [S121].

Next, the controller 170 may adjust the shading intensity of the variable shading panel differently based on the measured ambient brightness [S122]. The shading intensity may be adjusted by controlling the amount of current supplied to the variable shading panel.

For example, when the measured ambient brightness is high, the controller 170 may control the shading intensity to become darker. Therefore, it is possible to prevent degradation of visibility due to decreases in the ACR caused by external light in a bright room environment.

Furthermore, when the measured ambient brightness is lower, the controller 170 may control the shading intensity to become lighter. Therefore, the advantage of the transparent display may be maintained in a darkroom environment Various aspects may be implemented using a machine-readable medium having instructions stored thereon for execution by a processor to perform various methods presented herein. Examples of possible machine-readable mediums include HDD(Hard Disk Drive), SSD(Solid State Disk), SDD(Silicon Disk Drive), ROM, RAM, CD-ROM, a magnetic tape, a floppy disk, an optical data storage device, the other types of storage mediums presented herein, and combinations thereof. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. An image display device comprising:
 a transparent display comprising a transparent display panel and a variable shading panel overlaid on one side of the transparent display panel; and
 a controller configured to:
 control a portion of the variable shading panel related to a location of video content displayed on the transparent display panel to be in a shading mode; and
 control a remaining portion of the variable shading panel to be in a transparent mode,
 wherein the portion of the variable shading panel in the shading mode is determined by at least one of a plurality of image parameters of the video content, the at least one of the plurality of image parameters of the video content including at least one of contrast, brightness or sharpness of the video content, and
 wherein the portion of the variable shading panel in the shading mode is related to a region where the at least one of the plurality of image parameters of the video content is either greater than or equal to a predetermined value or smaller than the predetermined value.

2. The image display device of claim 1, wherein the variable shading panel comprises an electrochromic device, and
 wherein the controller is configured to:
 supply power to the portion of the variable shading panel to be in the shading mode; and
 supply no power to the remaining portion of the variable shading panel to be in the transparent mode.

3. The image display device of claim 1, wherein the variable shading panel is overlaid on a back of the transparent display panel, and
 wherein the video content is displayed in a background of the portion of the variable shading panel in the shading mode.

4. The image display device of claim 3, wherein external light incident from the back of the transparent display is blocked by the portion of the variable shading panel in the shading mode.

5. The image display device of claim 1, further comprising an ambient light sensor, wherein the controller is configured to adjust shading intensity of the portion of the variable shading panel in the shading mode based on to brightness of ambient light detected by the ambient light sensor.

6. The image display device of claim 5, wherein the controller is configured to control the shading intensity to be proportional to the detected ambient light brightness.

7. A method of controlling an image display device, the method comprising:
 determining a display location of video content displayed on a transparent display panel; and
 controlling a portion of a variable shading panel overlaid on one side of the transparent display panel to be in a shading mode and a remaining portion of the variable shading panel to be in a transparent mode, wherein the portion of the variable shading panel is related to the display location,
 wherein the portion of the variable shading panel in the shading mode is determined by at least one of a plurality of image parameters of the video content, the at least one of the plurality of image parameters of the video content including at least one of contrast, brightness or sharpness of the video content, and
 wherein the portion of the variable shading panel in the shading mode is related to a region where the at least one of the plurality of image parameters of the video content is either greater than or equal to a predetermined value or smaller than the predetermined value.

8. The method of claim 7, wherein the variable shading panel comprises an electrochromic device,
 wherein power is supplied to the portion of the variable shading panel such that several shading regions of the variable shading panel are in the shading mode, and
 wherein no power is supplied to a remaining portion of the variable shading panel such that the remaining shading portion is in the transparent mode.

9. The method of claim 7, wherein the variable shading panel is overlaid on a back of the transparent display panel, and
 wherein the video content is displayed in a background of the portion of the variable shading panel in the shading mode.

10. The method of claim 9, wherein external light incident from the back of the transparent display panel is blocked by the portion of the variable shading panel in the shading mode.

11. The method of claim 7, wherein the image display device further comprises an ambient light sensor, and
 wherein the method comprises adjusting shading intensity of the portion of the variable shading panel in the shading mode based on to brightness of ambient light detected by the ambient light sensor.

* * * * *